United States Patent [19]
Beezer

[11] 3,751,996
[45] Aug. 14, 1973

[54] DEVICE FOR TRANSMITTING ADJUSTABLE TRANSLATORY MOVEMENTS IN TWO AXIS-DIRECTIONS

[76] Inventor: Earl F. Beezer, One Andrea Blvd., Saddle Brook, N.J. 07662

[22] Filed: Nov. 3, 1971

[21] Appl. No.: 195,271

[52] U.S. Cl. ................................... 74/53
[51] Int. Cl. ............................... F16h 25/12
[58] Field of Search .................. 74/53, 55, 110; 33/27 K, 27 R, 18 B; 214/1 BB

[56] References Cited
UNITED STATES PATENTS

| | | | |
|---|---|---|---|
| 546,055 | 9/1895 | Pitt | 74/55 |
| 1,748,443 | 2/1930 | Dawson | 74/55 |
| 2,370,383 | 2/1945 | Wallace et al. | 74/571 |
| 2,423,701 | 7/1947 | Hardy | 74/55 |
| 2,521,711 | 9/1950 | Galliano | 74/571 |
| 3,404,459 | 10/1968 | Redman | 33/27 K |

Primary Examiner—Charles J. Myhre
Assistant Examiner—Wesley S. Ratliff, Jr.
Attorney—John J. McGlew et al.

[57] ABSTRACT

A device for transmitting accurate movements from a rotary input shaft to two separate axis-movable members comprises a first member which is guided for movement along one axis and a second member which is guided on the first member for movement along a second axis. The shaft carries a separate cam for driving each member which is adjustably connected to at least one of the members so that the controlled movement may be adjusted for each shaft rotation. The adjustable connection advantageously includes a lever with a roller follower which is guided by the cam and an arm which carries a shiftable pivot connection to a slideway carried on one of the movable members.

11 Claims, 10 Drawing Figures

Patented Aug. 14, 1973

INVENTOR.
EARL F. BEEZER

BY
John J. McGlew
ATTORNEY

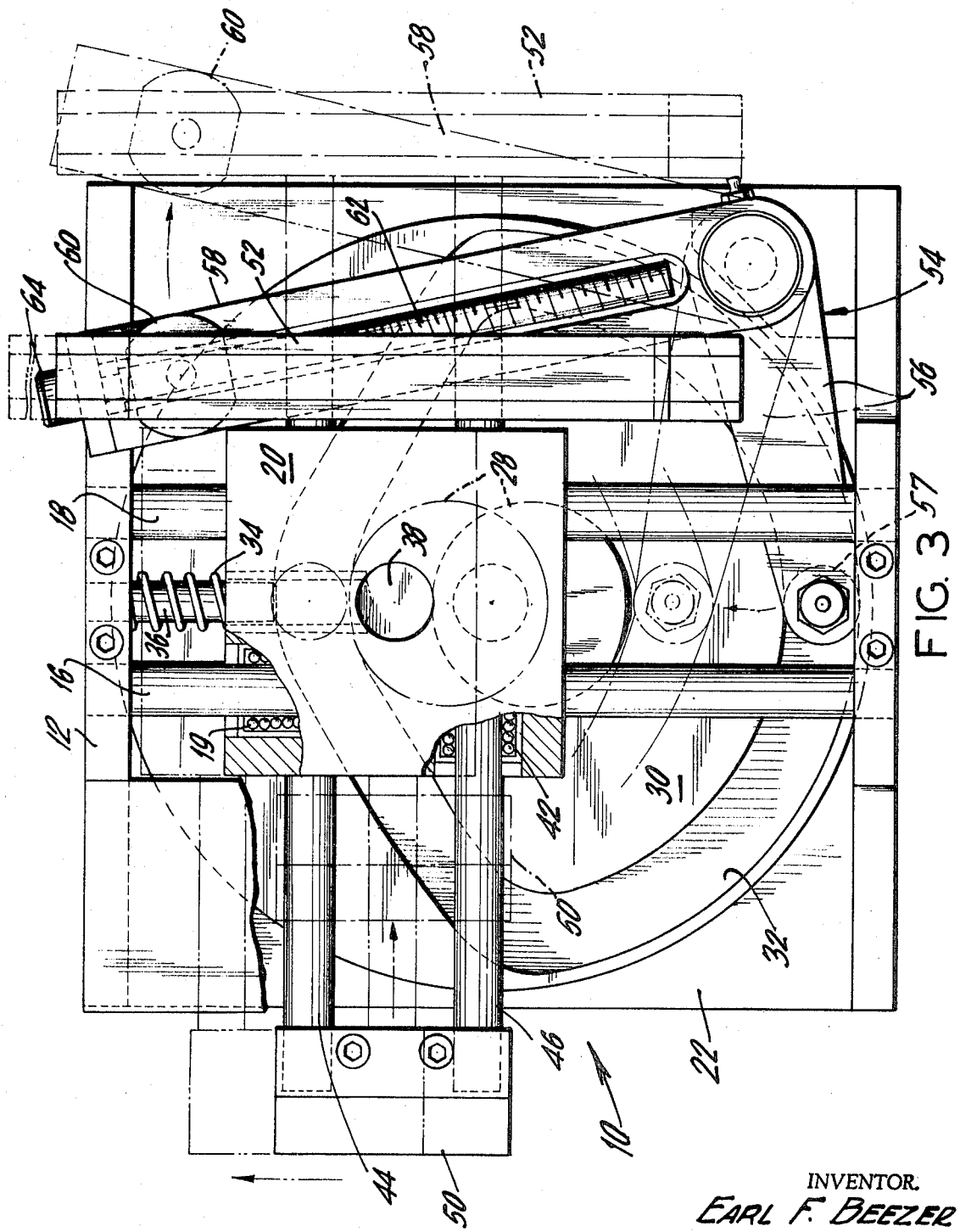

Patented Aug. 14, 1973
3,751,996
5 Sheets-Sheet 3
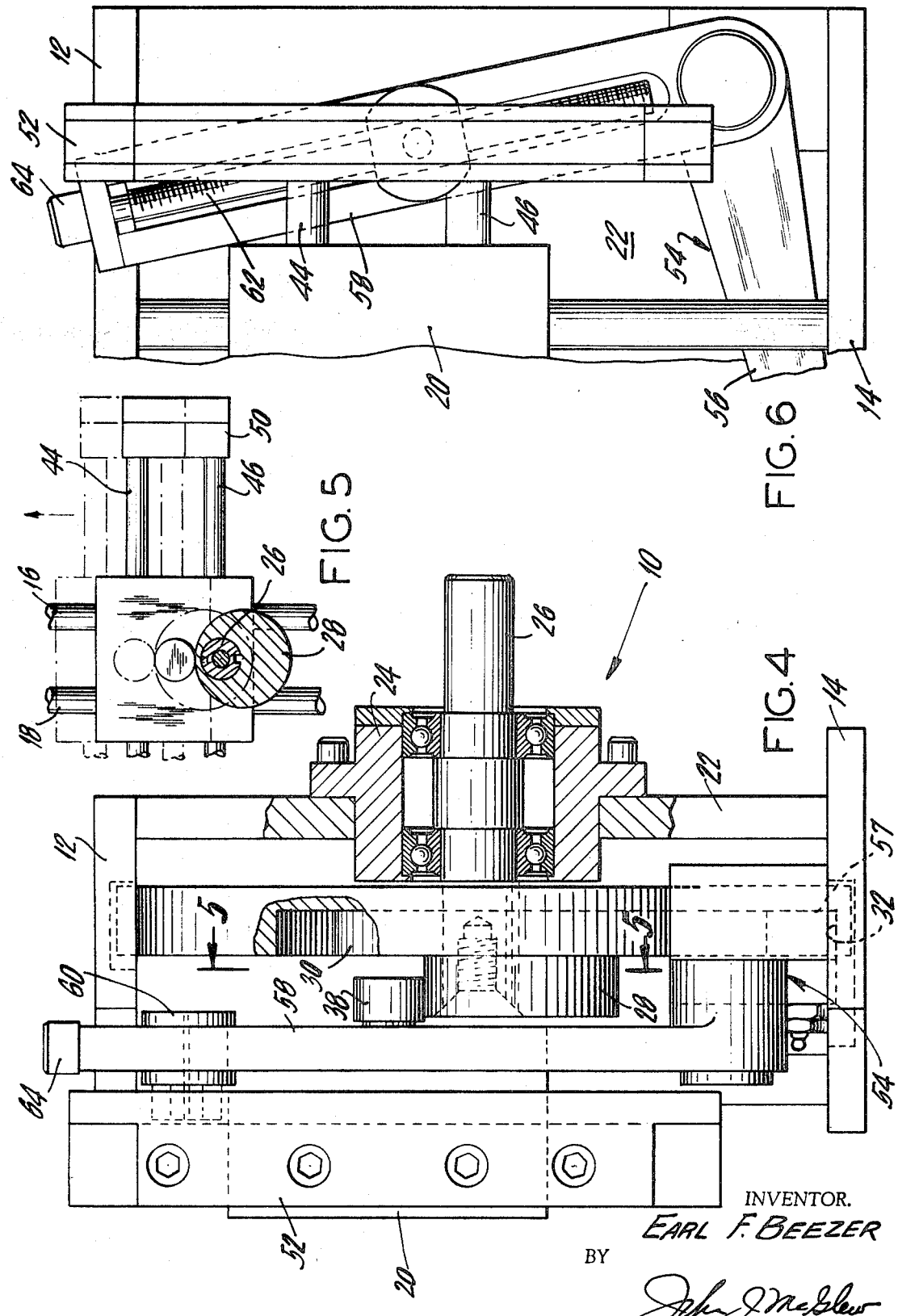
INVENTOR.
EARL F. BEEZER
BY
John J. McGlew
ATTORNEY INVENTOR.
EARL F. BEEZER
BY John J. McGlew
ATTORNEY

DEVICE FOR TRANSMITTING ADJUSTABLE TRANSLATORY MOVEMENTS IN TWO AXIS-DIRECTIONS

BACKGROUND OF THE INVENTION

1. Field of the Invention

This invention relates in general to motion control devices and in particular to a new and useful device for controlling the motion, particularly of machine parts, which includes two axis-movable members which are guided for movement along a respective axis and with means for driving the members from a rotary shaft through connecting drive means which are adjustable.

2. Description of the Prior Art

The present invention is an improvement over the invention disclosed and described in application Ser. No. 109,229 filed Jan. 25, 1971 now U.S. Pat. No. 3,703,834. The prior application referred to a device for moving particularly machine parts in two axis-controlled directions from a single rotary shaft drive. Both the present invention and the prior application refer to devices for moving machine parts backwardly and forwardly in two separate axis-controlled movements. The known devices of this type comprise separate and complicated independent elements for effecting each axis movement. In addition, the connecting mechanism was such that the slideways with similar movable parts tended to wear out or to even jam or become subject to severe overloadings during their operation because of the requirements for the transmission elements to transmit the driving force through large pressure angles.

SUMMARY OF THE INVENTION

The present invention is an improvement over the prior application, particularly in respect to the means for adjustably moving movable parts in two axis-controlled directions. The invention provides a first movable member which is mounted for rolling friction movement along one or more rod guideways along a first axis and it carries roller bearings for supporting guide rods of a second member which is movable backwardly and forwardly on the first member along a second axis. Each member is driven by a single rotary shaft having a first cam which is directly engaged with a roller follower on the first member for shifting it in a controlled back and forth movement along its axis. The second member is connected to a separate cam on the same shaft which drives through a lever and an adjustable slideway connection so that its movement may be controlled in magnitude and amount by the cam and adjustable connection.

Accordingly it is an object of the invention to provide an improved motion transmitting device which comprises a first member which is guided for movement along a first axis and a second member which is guided on the first member for movement along a second axis, and rotary shaft means for driving said first and second members independently and with at least one of the drive movements being adjustable.

A further object of the invention is to provide a motion transmitting device which includes a rotary shaft having a first cam which is connected to move a first member along a guide rod oriented on a first axis, and with a second member which is movable on a guide rod in bearings carried by the first member which is driven by a second cam on the shaft through a lever having an adjustable pivotal connection to the second member.

A further object of the invention is to provide a motion transmitting mechanism which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing:

FIG. 3 is a partial section and partial elevational view taken along the line 3—3 of FIG. 1;

FIG. 4 is a section taken along the line 4—4 of FIG. 2;

FIG. 5 is a section taken along the line 5—5 of FIG. 4, but on a reduced scale;

FIG. 6 is a partial elevational view showing the adjustable connection between the drive lever and the movable member;

GENERAL DESCRIPTION OF THE PREFERRED EMBODIMENTS

Figure 1:
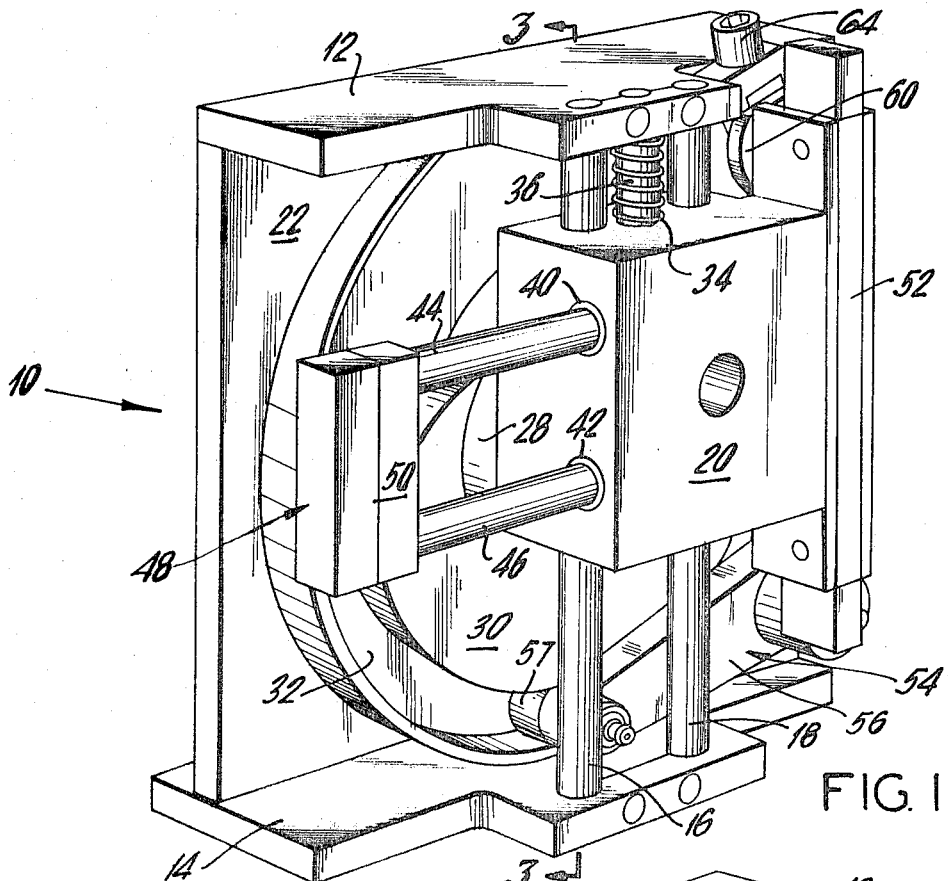
FIG. 1 is a front perspective view of a motion transmitting device constructed in accordance with the invention.
Figure 2:
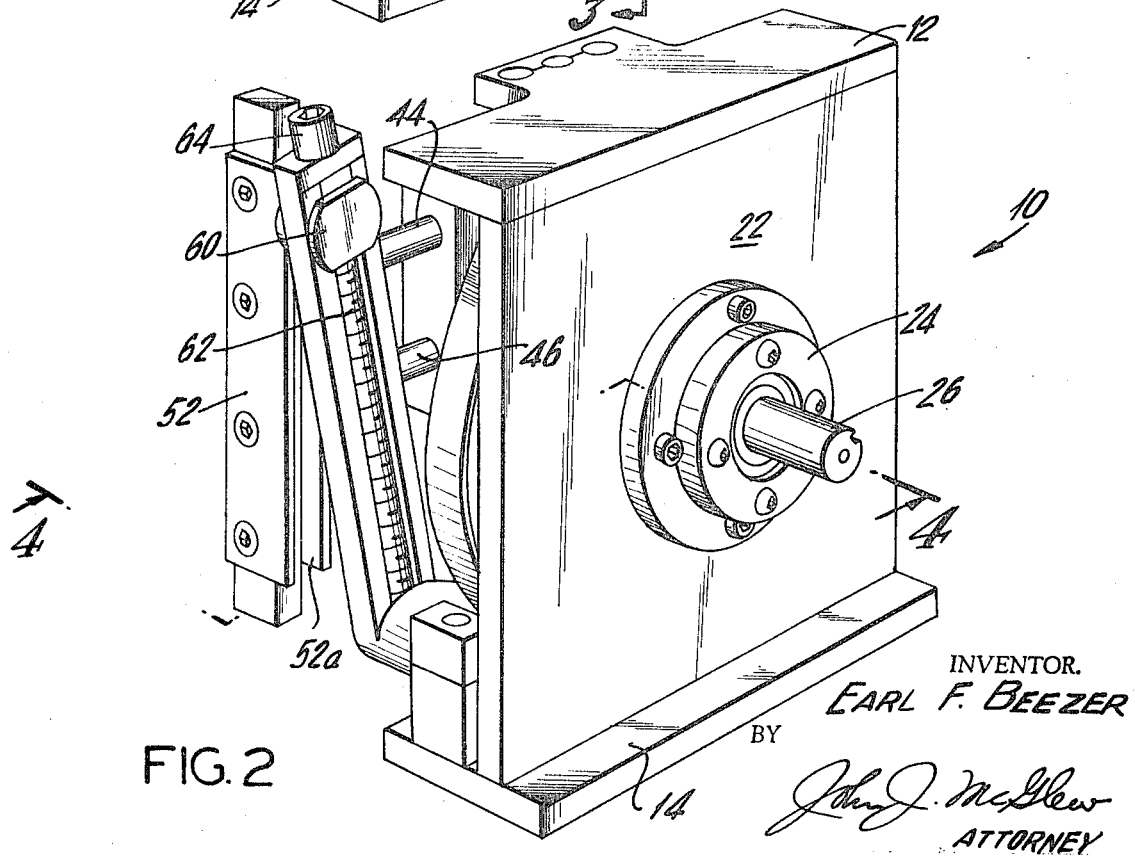
FIG. 2 is a view similar to FIG. 1 of the rear of the device shown in FIG. 1.
Figure 7:
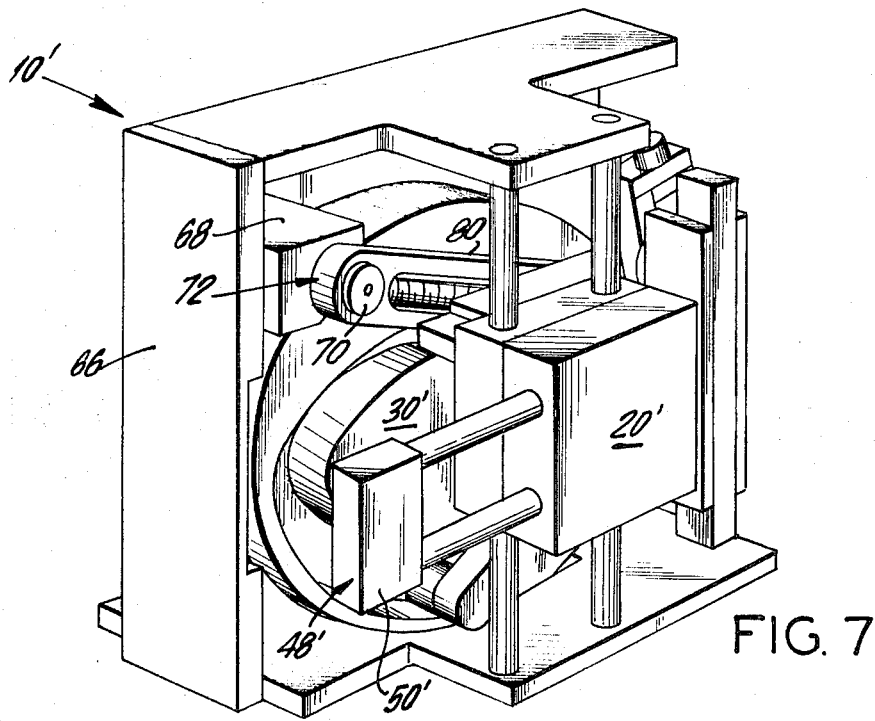
FIG. 7 is a view similar to FIG. 1 but of another embodiment of the invention.

Referring to the drawings in particular, the invention embodied therein in FIGS. 1 to 6 comprises a motion transmitting device which includes a mounting frame generally designated 10, having a top wall 12 and a bottom wall 14 which supports two upright members or columns 16 and 18. The columns 16 and 18 provide a guideway for a first movable part 20 for movement along a first axis, for example, a vertical axis on roller guide bearing 19. (FIG. 3)

The frame 10 includes a rear plate 22 which carries a roller bearing assembly 24, for rotatably supporting a drive shaft 26. The drive shaft 26 carries cam means in the form of a cam 28 and a disc cam 30 with a control groove 32 recessed into an end face.

A spring 34 carried on a guide rod element 36 biases the first member 20 in a downward direction in order to position a roller follower 38 (FIG. 4) which is carried on the first member into association with the cam 28, so that the cam 28 will provide the controlled movement of the first member 20.

In accordance with the invention the first member 20 carries roller guide bushings 40 and 42 which provide linear rolling contact movement for guide rods 44 and 46 of a second member, generally designated 48. The second member 48 includes an end block 50 at one end which may, for example, be connected to a machine part which requires movement and a guideway or slide 52 at the opposite end of the rods 44 and 46. The second member 48 is driven by the cam 30 through a drive lever, generally designated 54. The drive lever 54 includes a first arm 56 carrying a roller follower 58 which is engaged in the control groove 32 of the cam 30 to oscillate the lever and produce a corresponding oscillating movement of a second drive arm 58.

An important feature of the invention is that the motion transmitted by the drive lever 54 to the second member 48 may be adjusted by adjusting the connection between the second arm 58 and the guideway 52. This adjustment includes a movable pivot slide 60 which is movable along the drive arm 58, (see FIG. 2), and it has an end which is slidable in a slideway 52a of the guideway 52. The pivot slide is adjusted along the length of the drive arm 58 by rotating a threaded spindle 62, to cause a nut portion of the pivot slide 60 which is engaged with the spindle to advance therealong. The spindle 62 is provided with a head 64, which may be easily engaged with a tool for the purpose of adjusting the connection between the drive arm 58 of the lever 54 and the second member 48, so that the magnitude of oscillatory movement of the second member 48, for each rotation of the shaft 26, may be adjusted.

Thus the invention provides a simple means for moving machine parts or other elements in defined path movements in two axes directions in a combined movement which permits movement to any point in a plane. The device may be used, for example, by connecting the first member 20 to a first part to be operated, or to a part of a machine, and connecting the second member to a second part to be operated, or to a part of a machine. For example, the second member 48 may be connected to a part which must be moved upwardly and then transversely, and then downwardly, and then through a similar path in a return motion. In some instances it is desirable not only to adjust the movable second member so that its magnitude of movement can be varied but also the first member, and in such a case the embodiment of the invention shown in FIGS. 7 to 10 applies.

Figure 8:
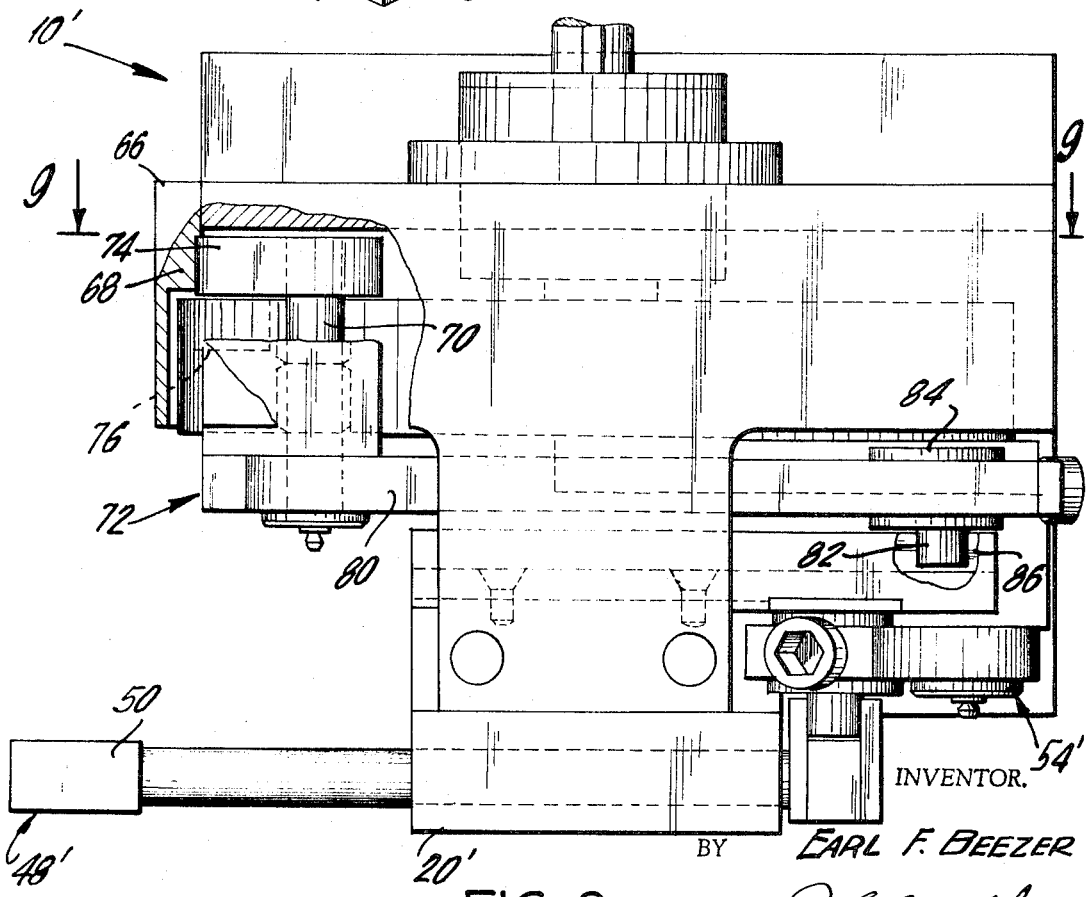
FIG. 8 is a partial top plan and partial horizontal sectional view of the mechanism shown in FIG. 7.
Figure 9:
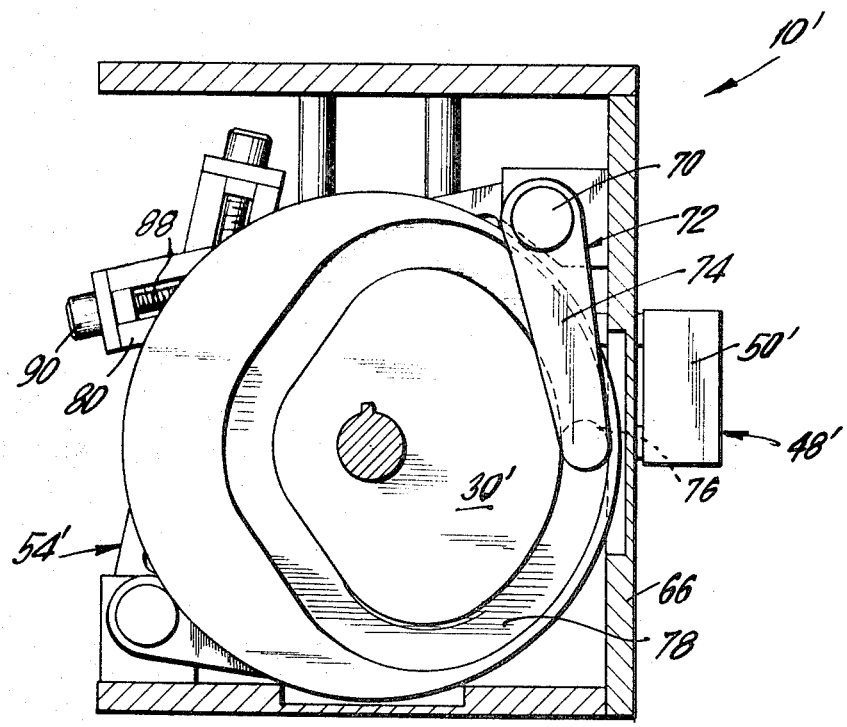
FIG. 9 is a section taken along the line 9—9 of FIG. 8.

In the embodiment of FIGS. 7 to 10, similar parts are designated with numbers similar to the embodiment of FIGS. 1 to 6, but the numbers are provided with primes. In this construction a frame 10' includes an additional end wall 66, which carries a mounting block 68 for a pivot pin 70 of a second drive lever generally designated 72. The second drive lever 72, as shown in FIGS. 8 and 9, carries a drive arm 74 with a roller follower 76, which engages in a control groove 78 of a disc cam 30' which has a control groove on each side. The lever 72 also includes a drive arm 80, which is adjustably connected to the first member 20' by engagement of a pin portion 82 of a pivot slide 84 in a groove 86 of the first member 20'. The pivot slide 84 comprises a nut which is engaged with a spindle 88 having a head 90 which may be rotated by a tool in order to shift the pivot slide 84 backwardly and forwardly therealong in an adjustment which is similar to the pivot slide 60 of the first embodiment.

Figure 10:
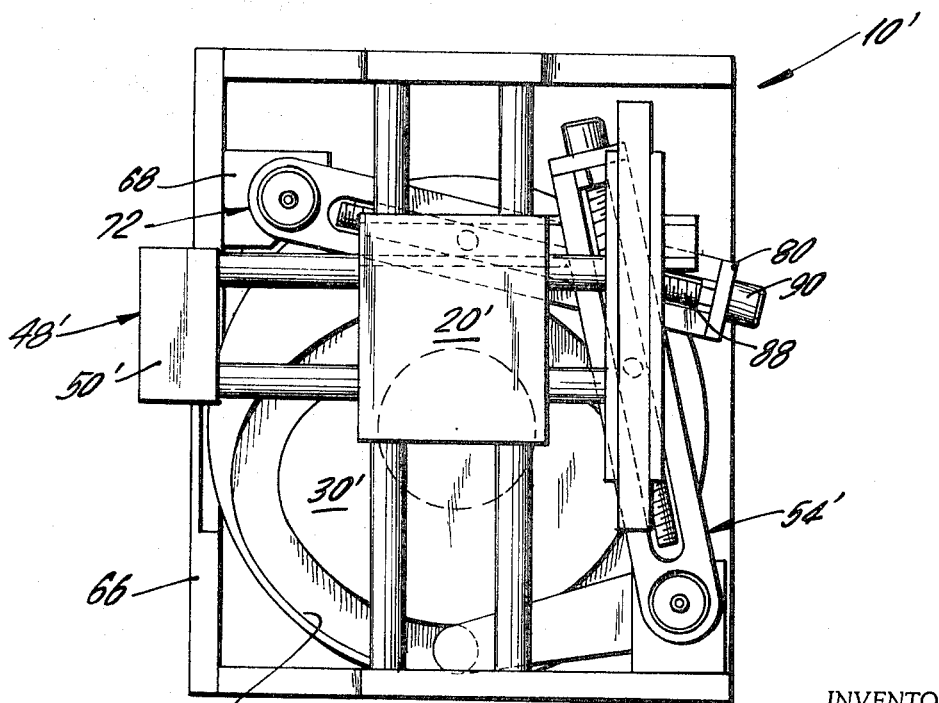
FIG. 10 is a front elevational view of the mechanism shown in FIG. 7.

Thus the second embodiment provides for an adjustable drive connection between both the first member 20' and the second member 48'. The second member 48' is driven from a drive lever 54' which is identical with the construction described in respect to the first embodiment. For this purpose the disc cam 30' has a control groove 32' on its opposite side, as shown in FIG. 10.

While specific embodiments of the invention have been shown and described in detail to illustrate the application of the principles of the invention, it will be understood that the invention may be embodied otherwise without departing from such principles.

What is claimed is:

1. A motion transmitting device, particularly for positioning one machine part in relation to another, comprising a first direction guide means, a first member movable to and fro on said first direction guide means, a second direction guide means carried on said first member extending at an angle to said first direction guide means, a second member movable to and fro on said second direction guide means, rotatable shaft means, first drive means connected between said shaft means and said first member for moving said first member, second drive means connected between said shaft means and said second member, at least one of said first and second drive means having a means for adjusting its connection to the associated first and second drive member for varying the magnitude of movement of said drive member in accordance with the rotation of said shaft.

2. A motion transmitting device according to claim 1, wherein said first drive means comprises a first cam rotatable with said shaft means, said second drive means comprising a second cam rotatable with said drive means, first and second levers connected between said first and second members and being oscillatable by said first and second cams, the connection between at least one of said first and second levers and said first and second members being adjustable.

3. A motion transmitting device according to claim 1, wherein said first direction guide means comprises a longitudinal guide, said second directional guide means comprising a transverse guide.

4. A motion transmitting device according to claim 1, wherein said rotatable shaft means comprises a rotatable shaft having first and second cam portions thereon, said first member having a roller follower engaged with said first cam portion and being movable by rotation of said first cam portion, the drive lever pivotally mounted adjacent said cam and having a first arm with a roller follower engaged with said cam, and a second arm connected to said second member for moving said second member backwardly and forwardly on said first member, said means for adjusting the connection between at least one of said first and second members with said rotary drive shaft comprising an adjustable connection between said lever and said second member.

5. A motion transmitting device according to claim 4, wherein said second member carries a slideway, said lever having a second drive arm with a slide pivot movable therealong, said slide pivot being connected in said guideway of said second member.

6. A motion transmitting device according to claim 1, wherein said slide pivot comprises a nut, said lever drive arm having a rotatable spindle engaged with said nut and being rotatable to shift said nut along said drive arm.

7. A device for moving a member along a defined path with an adjustable movement, comprising a rotatable shaft, a cam carried on said shaft and being rotatable therewith, a lever member being pivotally mounted adjacent said shaft and having a first arm portion with a roller follower engaged wtih said cam and being movable thereon, and having a second drive arm, a movable member, guide means for guiding said movable member for back and forward movement, said movable member having a portion with a slideway extending normal to the path of movement of said movable member, said drive arm having a slide pivot carried thereon engageable in said slideway, and means for adjusting said slide pivot along said drive arm for varying the magnitude of motion of said member with oscillation of said drive lever.

8. An apparatus according to claim 7, wherein said drive arm carries a rotatable spindle, said slide pivot having a threaded portion engaged with said spindle, said spindle being rotatable to shift said slide pivot.

9. A motion transmission device comprising a frame, a first guide rod mounted in said frame, a first member movable along said first guide rod, a shaft rotatably supported in said frame having first and second cams thereon, follower means carried on said first member engaged with said first cam and being movable upon rotation of said shaft, said first member having a roller guideway thereon, a second member movable in said roller guideway transversely to the axis of said first rod, a lever pivotally mounted on said frame and having a first arm portion with a follower engaged with said second cam and being movable thereby upon rotation thereof, and a second arm portion having a pivot which is adjustably connected to said second member.

10. An apparatus according to claim 1, wherein said second member includes a second rod, an end plate connected to said second rod, and a guide member connected to the opposite end of said second rod on the other side of this first member, said guide member having a guideway, said pivotal connection of said lever to said rod comprising a slide pivot having a pin portion engaged in said guideway and being adjustable along said drive arm portion of said lever.

11. A motion transmitting device according to claim 10, including a first member drive lever having a first arm carrying said follower means engaged with said first cam and a second drive arm, a pivot slide carried on said drive arm and being connected to said first member, said first member having a slideway thereon along which said pivot slide is movable.

* * * * *